3,729,427
NEUTRAL DENSITY SOLUTIONS CONTAINING NIGROSIN DYE AND CARBON BLACK

Allan L. Louderback, Temple City, Calif., assignor to Baxter Laboratories, Inc., Morton Grove, Ill.
No Drawing. Filed Apr. 8, 1971, Ser. No. 132,562
Int. Cl. F21v 9/02; G02b 5/24
U.S. Cl. 252—300                                      2 Claims

ABSTRACT OF THE DISCLOSURE

A neutral density solution comprising an admixture of nigrosin dye and a carbon black dispersion in dilute aqueous solution which exhibits absorbance linearity in the visible and ultraviolet range.

---

This invention relates to a neutral density solution for the control of spectrophotometric equipment and, more particularly, to a grey solution which exhibits absorbance linearity in the visible and ultraviolet range.

In the operation of spectrophotometric equipment for measuring the optical density of various solutions it is desired to employ control standards for periodically checking the accuracy of the equipment and to serve as a reference standard. These control standards have known optical densities and exhibit absorption maxima at certain wavelengths. Thus, they can be used on the spectrophotometric equipment to determine whether the instrument is providing the correct optical density readings.

Various aqueous salt solutions have been used heretofore for this purpose, for example, solutions of potassium chromate or cobaltous ammonium sulfate in 0.1 normal sodium hydroxide or potassium dichromate in 0.1 normal sulfuric acid. Another such solution, known as Thomson's neutral density solution, is described in Transactions of the Faraday Society, vol. 42, pp. 663–5 (1946). The latter solution contains a mixture of metal salts dissolved in water in the following amounts per liter:

| | |
|---|---|
| $Cr_2(SO_4)_3 \cdot K_2SO_4 \cdot 24H_2O$ | g__ 16.67 |
| $CuSO_4 \cdot 5H_2O$ | g__ 33.33 |
| $CoSO_4 \cdot (NH_4)_2SO_4 \cdot 6H_2O$ | g__ 39.50 |
| $K_2Cr_2O_7$ | mg__ 120.0 |

While Thomson's neutral density solution is useful for certain purposes, it exhibits peaks in optical density at various wavelengths and does not provide the desired linearity for optimum control of spectrophotometric equipment. Because it exhibits these varying absorption maxima at specific wavelengths, it is not actually a neutral density solution.

Accordingly, it is an object of this invention to provide an improved neutral density solution for the control of spectrophotometric equipment.

It is another object of this invention to provide a grey solution which exhibits absorbance linearity in the visible and ultraviolet range.

Other objects and advantages of the invention will be apparent to those skilled in the art after reading the disclosure hereof.

It has now been found that the foregoing objects are achieved by providing a mixture of nigrosin dye and carbon black dispersion or India ink in dilute aqueous solution.

The nigrosin dye employed in this invention is nigrosin, water soluble, as certified by the Biological Stain Commision (C.I. No. 50420) and described by Conn, Biological Stains, The Williams and Wilkins Co., at pages 125, 294–5 (7th ed. 1961). To be certified, the nigrosin dye must appear distinctly black and not have a bluish hue to the eye. Any mixture of blue-black or violet indulin with a yellow dye in such a proportion that the resulting blend appears black is suitable. A preferred example of a commercially available certified product is identified as "Nigrosin (Water Soluble)" by the National Aniline Division of Allied Chemical Company.

The carbon black employed in this invention is an amorphous, quasi-graphitic form of carbon of small particle size such as, for example, gas black, furnace black, channel black and thermal black. These carbon blacks are generally obtained by the incomplete combustion of gaseous hydrocarbons, for example, natural gas.

A preferred carbon black is lampblack. Lampblack is made by burning substances rich in carbon such as, for example, turpentine, petroleum, tar, acetylene, and similar such oils, fats and resins in a limited supply of air.

The carbon black employed in this invention preferably has a particle size in the range of from about 100 A. to 4000 A. in diameter and preferably is dispersed in aqueous solution at a concentration of from about 10% to 25% solids.

A suitable example of a carbon black dispersion is India ink, which generally consists of lampblack or other carbon black and a stabilizer such as, for example, gelatin, dextrin, or gum arabic in aqueous suspension. A preferred India ink is commercially available as "Pelikan-Gunther Wagner-Auszieh Tusche." This is an India ink imported into the United States from Germany. Another suitable commercially available India ink is the product identified as "A. W. Faber-Castell Higgins 4415" by the Higgins Ink Co., Inc., Newark, N.J.

It has been found that admixture of nigrosin dye and a carbon black dispersion or India ink in suitable proportions in dilute aqueous solution provides a grey solution which exhibits absorbance linearity in the visible and ultraviolet range.

In general, the proportions of these substances employed in the present invention are from about 0.2 to 2 mg. of the nigrosin dye and about 0.002 to 0.02 ml. of the carbon black dispersion or India ink per liter of water. The neutral density solution can be conveniently prepared by admixing from about 1 to 10 ml. of a stock solution of 200 mg. nigrosin dye in one liter of water with from about 1 to 10 ml. of India ink or other said carbon black dispersion in one liter of water followed by adding the mixture to 100 ml. of water. Preferably, about 2 to 4 ml. of the aforesaid nigrosin dye stock solution is conveniently admixed with about 2 to 4 ml. of the aforesaid India ink stock solution and added to 100 ml. of distilled water.

In practice, the neutral density solution of this invention is used for checking the accuracy of spectrophotometric instruments by its placement in the instrument at predetermined periodic and regular intervals.

The following examples will further illustrate the invention although the invention is not limited to these specific examples.

EXAMPLE 1

A neutral density solution is prepared as follows: 100 milligrams of "Nigrosin (Water Solube)," National Aniline Division, Allied Chemical, C.I. No. 50420, Biological Stain Commission, is added to 500 milliliters of distilled water and thoroughly mixed to form Solution A. Two milliliters of "Pelikan-Gunther Wagner-Auszieh Tusche" India ink is added to one liter of distilled water and thoroughly mixed to form Solution B. A grey Solution C is then made by mixing 3.2 ml. of Solution A with 2.6 ml.

of Solution B and adding the mixture to 100 ml. of distilled water. The optical density of Solution C is then determined on a Beckman "Discrete Scanning Analyzer" at wavelengths ranging from 340 mμ to 650 mμ. A substantially linear absorbance curve is obtained in this entire wavelength range with optical density readings of 0.25±10% at each interval of 10 mμ.

The outstanding advantage of the neutral density solution of this example is evident from the foregoing linearity at all wavelengths. In common practice, a variety of biochemical tests are employed on conventional spectrophotometric equipment and different wavelengths are used for various of these tests. The neutral density solution of this invention is applicable to all these wavelengths and it is, therefore, unnecessary to use separate control standards which will vary, depending upon the biochemical tests and wavelengths employed on the instruments.

Another advantage of the neutral density solution of this invention is that within the proportions specified, absorbance linearity is exhibited across the visible and ultraviolet wavelength band at any desired optical density. Examples 2 to 4, below, further illustrate this absorbance linearity at, respectively, low, medium and high optical densities.

EXAMPLE 2

Example 1 is repeated except that Solution C is prepared by mixing 2.5 ml. of Solution A with 2.1 ml. of Solution B followed by adding the mixture to 100 ml. of distilled water. A substantially linear absorbance curve is obtained in the entire wavelength range from 340 mμ to 650 mμ with optical density readings of 0.2±10% at each interval of 10 mμ.

EXAMPLE 3

Example 1 is repeated except that Solution C is prepared by mixing 5 ml. of Solution A with 4.2 ml. of Solution B followed by adding the mixture to 100 ml. of distilled water. A substantially linear absorbance curve is obtained in the entire wavelength range from 340 mμ to 650 mμ with optical density readings of 0.4±10% at each interval of 10 mμ.

EXAMPLE 4

Example 1 is repeated except that Solution C is prepared by mixing 8.3 ml. of Solution A with 6.7 ml. of Solution B followed by adding the mixture to 100 ml. of distilled water. A substantially linear absorbance curve is obtained in the entire wavelength range from 340 mμ to 650 mμ with optical density readings of 0.66±10% at each interval of 10 mμ.

EXAMPLE 5

A neutral density solution is prepared by admixing together 32 ml. of the Solution A and 26 ml. of the Solution B of Example 1, above, and making up to a volume of one liter by addition of distilled water. The optical density of Solution C is then determined on a Technicon 12/60 "AutoAnalyzer," which is set to make analytical determinations of twelve different blood serum components. The colorimeter for each channel on the instrument, except cholesterol, is adjusted to 0.000 with water; then Solution C is allowed to purge through the system from the same point as the water. The following Table I lists the twelve serum components and the optical density read for Solution C at each of the appropriate settings, except cholesterol.

Cholesterol is not checked by the neutral density solution because of the high acidity of the reagent employed in the cholesterol test. It is not desired to pass the dilute aqueous neutral density through the tubing used in this test.

TABLE I

| Serum components: | Optical density |
|---|---|
| Calcium | 0.310 |
| Phosphorus | 0.320 |
| Glucose | 0.300 |
| Blood urea nitrogen (BUN) | 0.330 |
| Uric acid | 0.280 |
| Cholesterol | *0.000 |
| Total protein (reference) | 0.300 |
| Total protein (blank) | 0.310 |
| Albumin (reference) | 0.300 |
| Albumin (blank) | 0.320 |
| Total bilirubin (reference) | 0.250 |
| Total bilirubin (blank) | 0.240 |
| Alkaline phosphatase | 0.360 |
| Lactic dehydrogenase (LDH) (reference) | 0.320 |
| LDH (blank) | 0.320 |
| Serum glutamic oxalacetic transaminase (SGOT) | 0.320 |

*Cholesterol is not checked, as noted above.

The neutral density solution of this example is used to check the accuracy of the Technicon 12/60 "AutoAnalyzer" instrument by daily tests or by more frequent tests when the equipment is in constant operation. When the equipment is functioning properly, the optical density of the neutral density solution varies by less than ±10% from the values shown by each instrument. Variation by more than 10% is considered unacceptable and indicates malfunctioning of the equipment such as, for example, clogging of the tubing with particulate matter, electronic trouble and the like problems. Due to the sensitivity of the various biochemical determinations made on automated analytical equipment such as the foregoing, it is highly desirable in practice to employ the neutral density solution of this invention for periodic checking and control of said equipment.

The neutral density solution of this invention has the further advantage over the heretofore used acid and basic salt solutions in being non-reactive to the plastic tubing used in the "AutoAnalyzer" and to the chemical substances passed through the tubing following the employment of the neutral density solution. This non-reactivity is important so that precipitation of reagents or substrates does not occur in the individual chemical channels on the instrument.

It will be understood that the neutral density solution of this invention is not limited to use on the specific instruments illustrated in the foregoing examples but that it can be similarly used for checking the accuracy of other spectrophotometric and colorimetric equipment employed in measuring the optical density of transparent solutions at various wavelengths, for example, the "Coleman Jr. II" instrument. It is particularly adaptable for use on multi-channel analytical equipment designed to make determinations of multiple components, for example, the various constituents of blood serum and other biological fluids. Examples of such equipment are those set foth in U.S. Pats. 2,797,149; 2,999,417; 3,098,717; 3,192,968; 3,193,358; 3,193,359; 3,241,432; 3,364,811; and references cited therein.

Various other examples and modifications and adaptations of the foregoing examples will be apparent to those skilled in the art after reading the foregoing specification and the appended claims without departing from the spirit and scope of the invention. All such further examples, modifications and adaptations thereof are included within the scope of the invention.

What is claimed is:

1. A neutral density solution for the control of spectrophotometric equipment comprising an admixture of nigrosin dye C.I. No. 50420 as certified by the Biological Stain Commission and a carbon black dispersion in dilute aqueous solution which exhibits absorbance linearity in the visible and ultraviolet range and in which the proportions of the nigrosin dye and carbon black dispersion are from about 0.2 to about 2 mg. of the nigrosin dye and from about 0.002 to about 0.02 ml. of the carbon black dispersion per liter, said carbon black dispersion having a solids content of from about 10% to about 25%.

2. The neutral density solution of claim 1 in which the carbon black dispersion is India ink.

References Cited

Riffanlt et al., A Practical Treatise on Manufacture of Colors for Printing, 1874, pp. 524–5.

Hackh's Chemical Dictionary, Third Ed., 1944, p. 571.

GEORGE F. LESMES, Primary Examiner

J. P. BRAMMER, Assistant Examiner

U.S. Cl. X.R.

106—307; 252—408; 356—208